United States Patent [19]
Eshghi et al.

[11] Patent Number: 5,893,083
[45] Date of Patent: Apr. 6, 1999

[54] METHODS AND APPARATUS FOR MONITORING EVENTS AND IMPLEMENTING CORRECTIVE ACTION IN A COMPUTER SYSTEM

[75] Inventors: Kave Eshghi, Redland; Jean-Jacques Moreau, Bradley Stoke, both of England

[73] Assignee: Hewlett-Packard Company, Palo Alto, Calif.

[21] Appl. No.: 618,159

[22] Filed: Mar. 19, 1996

[30] Foreign Application Priority Data

Mar. 24, 1995 [EP] European Pat. Off. ............ 95301980
Nov. 24, 1995 [EP] European Pat. Off. ............ 95308460

[51] Int. Cl.⁶ ............................. G06F 17/00; G06F 11/00
[52] U.S. Cl. ............................. 706/45; 706/46; 395/181; 395/183.02; 395/200.54; 395/670
[58] Field of Search ..................... 395/50, 200.11, 395/60, 200.53, 200.54, 670–678, 180–181, 182.01–182.03, 183.01, 183.02, 184.01, 185.01; 364/281.3, 550; 706/45, 46

[56] References Cited

U.S. PATENT DOCUMENTS 5,159,685  10/1992  Kung ................................. 395/183.01

FOREIGN PATENT DOCUMENTS

94/09427  4/1994  WIPO ............................. G06F 9/44

OTHER PUBLICATIONS

Toshiharu Sugawara "A Cooperative LAN Diagnostic And Observation Expert System" Mar. 21, 1990, pp. 667–674 including front cover page 1990 Conference Proceedings.

"Control Reasoning Based on Goal Relationships within the Blackboard Framework QBB", by Achim Hoffman et al., *IPCCC*, 1992.

"ANM: Automated Network Management System" by M. Feridun et al., *IEEE Network* Mar. 1988, vol. 2, No. 2.

"A Continuous Real-time Expert System for Computer Operations" by R.L. Ennis et al., *IBM J. Res. Develop..* Jan., 1986.

"OASiX: A Real-Time Knowledge-Based System for UNIX Operations and Administration" by Se Young Park et al., *IEEE* 1991.

Morizet-Mahoudeaux, Pierre, "Maintaining Consistency of a Database During Monitoring of an Evolving Process by a Knowledge-Based System", IEEE Transactions on Systems, Man, and Cybernetics, vol. 21, No. 1, pp. 47–60, Jan. 1991.

Sugawara, Toshiharu et al., "A Cooperative LAN Diagnostic and Observation Expert System", International Phoenix Conference on Computers and Communications –Mar. 1990 Conference Proceedings, pp. 667–674.

*Primary Examiner*—Tariq R. Hafiz
*Assistant Examiner*—Jason W. Rhodes, Jr.

[57] ABSTRACT

Apparatus for assisting management of services provided by a computer system includes an inferencing engine (30) for carrying out inferencing operations on a declarative model (24) of a service, using facts about the system stored in a fact base (32). A resident goal store (102) contains declarative definitions of goals which concern availability of services and which it is desirable for the system to continue to satisfy; these definitions are linked to associated facts in the fact base. The service model (24) includes definitions of events which can occur in the system and may affect availability of services, and definitions of actions which can be taken to modify the configuration of the system. When occurrence of an event defined in the service model is reported to the apparatus, the event definition is used to guide analysis of the event report and appropriate updating of the fact base. Goals which are linked to the updated facts are then examined to assess whether the goals are still satisfied. If a goal is no longer satisfied the service model is searched for actions which can re-configure the system to enable the goal to be re-satisfied. If a goal involves information about an entity in a part of the system managed by a second, different management apparatus (10D), the second apparatus can be requested to establish a sub-goal concerning the status of that entity. Thereafter the second apparatus takes appropriate action, autonomously, to keep the sub-goal satisfied, and reports back only if it is unable to satisfy the sub-goal.

16 Claims, 6 Drawing Sheets

METHODS AND APPARATUS FOR MONITORING EVENTS AND IMPLEMENTING CORRECTIVE ACTION IN A COMPUTER SYSTEM

TECHNICAL FIELD

This invention relates to a method and apparatus for monitoring occurrence of events which may affect availability of services (such as electronic mail and print spooling) intended to be provided by a computer system, and for identifying and implementing corrective action which may be required to remedy effects of such events. In particular, but not exclusively, the present invention relates to a method and apparatus for monitoring events and implementing required actions in respect of services provided on a network of computers.

BACKGROUND ART

The complexity of computer systems and networks of computer systems has increased inexorably, so that such systems are now typically characterized by the presence and interaction of large numbers of system entities in providing a variety of system services. This in turn has placed a major strain on system management resources required to maintain continuous availability of system services, for example in connection with detection of faults and identification and correction of their causes.

One contribution to the resolution of this problem has been disclosed in WO 94/09 427, which describes a system management method and apparatus in which a respective declarative model is provided for each system service. This model specifies, independently of any particular task to be performed in relation to that service, the requirements or goals needing to be met for that service to be available, in terms of the entities required and their inter-relationships. A respective task program is provided for each task, such as installation, monitoring and fault diagnosis, for controlling performance of that task in a manner independent of any particular model, in terms of general inferencing operations that can be performed on any such model. Tasks are performed in relation to a service (e.g. fault-finding in respect of an inoperative print spooling service) by effecting inferencing operations on a declarative model relating to that service, under the control of the task program for that task.

In one implementation of the invention disclosed in WO 94/09 427 information on the system is made available through reference to a fact base which stores facts about the system and which can be updated through interaction with the system to provide desired information, either directly through queries to elicit specific items of information, or indirectly by inferencing from these items of information. An inferencing engine checks whether a requirement or goal associated with a service is being met by the system by performing inferencing operations on the relevant service model and by referring to the fact base, and, in the event that insufficient facts are present in the fact base, by causing interaction with the system to elicit further facts.

In the method and apparatus as described in WO 94/09 427 the operation of the inferencing engine is triggered by a requirement to perform a management task, typically at the request of a user to modify the system's services or to identify the cause of a service failure.

It is one object of this invention to provide a method and apparatus which enables management tasks to be initiated automatically, for example in response to detection of events indicating a possible change in the system status.

There is a practical limit to the size of system (i.e. overall number of system entities such as terminals, workstations and peripherals) which a single apparatus of the kind previously described can effectively manage. This limit, of the order of a few hundred entities, is imposed by various constraints, including memory available to store the fact base, processing capacity to support inferencing engine operations in respect of many different entities in an acceptably short time, consumption of network communications bandwidth and range of different management policies needed for different entities (e.g. in different locations or workgroups). It is in principle possible to partition a system into multiple sub-systems, each containing fewer than the maximum manageable number of entities and each having a respective system management apparatus. However, the management of each sub-system is then independent of all the others; furthermore, in practice it is not always simple, or even feasible, to assign a given entity exclusively to one sub-system or another, as it may provide services to multiple entities which themselves are in other respects better considered as being in different sub-systems.

It is another object of this invention to provide a method and apparatus which exploits automatic initiation of management tasks to facilitate the management of large networks containing, for example, several thousands of connected devices.

DISCLOSURE OF INVENTION

According to one aspect of this invention a system management method monitors occurrence of and attempts to remedy effects of events affecting a service provided by a computer system made up of cooperating physical and logical entities. The method provides a declarative model for the services. The model specifies requirements which need to be met for the service to be available. The requirements are set out in terms of required entities and their inter-relationships. At least one aspect of the service specifies a goal to be satisfied by the system. At least one fact which relates to the system and upon which the goal depends is specified. At least one event whose occurrence in the system can affect validity of the fact is defined. When the occurrence of the event is detected, a determination is made as to whether the fact is valid. If the fact has become invalid a process involving inferencing operations on the declarative model determines whether the goal is still satisfied. If the goal is no longer satisfied, the process looks for an operation which will enable the goal to be resatisfied. The process then performs the operation.

According to another aspect of the invention, a system management apparatus monitors occurrence of and attempts to remedy effects of events affecting a service intended to be provided by a computer system made up of cooperating physical and logical entities. The apparatus comprises a declarative model for specifying requirements which must be met for the service to be available. The requirements are set out in terms of the required entities and their inter-relationships. An inference engine performs inferencing operations in relation to the declarative model. A goal to be satisfied by the system is specified with respect to at least one aspect of the service. At least one fact relating to the system and upon which the goal depends is identified. At least one event whose occurrence in the system can affect validity of the fact is defined. The apparatus detects the occurrence of the event and then determines whether the fact is valid. If the fact has become invalid, the inferencing engine performs inferencing operations on the declarative model to determine whether the goal is still satisfied. If the goal is no longer satisfied, the apparatus seeks an operation which will enable the goal to be re-satisfied and then performs the operation.

According to a further aspect of the invention, a system management method monitors occurrence of and attempts to remedy effects of events in a computer system made up of cooperating physical and logical entities. The entities are logically arranged into groups, each including a management entity. The events affect a service intended to be provided by entities in a first group. The method comprises providing a declarative model for the service. The model specifies requirements which must be met for the service to be available. The requirements are set out in terms of the entities required and their inter-relationships. At least one aspect of the service or goal to be satisfied by the system is specified. A determination is made in a first management entity in the first group that satisfaction of the goal requires a sub-goal to be satisfied. That satisfaction of the sub-goal involves system entities in a second group different from the first group. A requirement to determine whether the sub-goal is satisfied is communicated to a second management entity in the second group. At least one fact relating to the second group and upon which the sub-goal depends is identified in the second management entity. At least one event whose occurrence in the second group can affect validity of the fact is defined in the second management entity. The second management entity is watched autonomously of the first management entity, for the occurrence of the event. When the event in the second management entity is detected a determination is made as to whether the fact is valid. If the fact has become invalid, a process that performs inferencing operations on the declarative model determines whether the sub-goal is still satisfied. If the sub-goal is no longer satisfied, an operation which will enable the sub-goal to be re-satisfied is sought. If the sought operation can be found it is performed. If no such operation can be found, non-satisfaction of the sub-goal is communicated to the first management entity.

According to yet another aspect of the invention a system management apparatus monitors occurrence of and attempts to remedy effects of events in a computer system made up of cooperating physical and logical entities. The entities are logically arranged into groups, each including a management entity. The events affect a service intended to be provided by entities in a first group. The apparatus comprises first and second management entities for first and second different ones of the groups, respectively. A declarative model specifies requirements which must be met in order for the service to be available. The requirements are set out in terms of the entities required and their inter-relationship. An inference engine in the second management entity carries out inferencing operations in relation to the declarative model. The apparatus specifies a goal to be satisfied by the system with respect to at least one aspect of the service. The first management entity determines that satisfaction of the (1) goal requires a sub-goal to be satisfied, and (2) sub-goal involves system entities in the second group. A link communicates from the first management entity to the second management entity a requirement to determine whether the sub-goal is satisfied. The second management entity identifies at least one fact relating to the second group and upon which the sub-goal depends. The second management entity defines at least one event whose occurrence in the second group can affect validity of the fact. The second management entity maintains a watch, autonomously of the first management entity, for occurrence of the event. Upon detection of the event, the second management entity determines whether the fact is valid. If the fact has become invalid, the inferencing engine performs inferencing operations on the declarative model to determine whether the sub-goal is still satisfied. If the sub-goal is no longer satisfied, the second management entity seeks an operation which will enable the sub-goal to be re-satisfied. The operation is performed if one can be found. If no such operation can be found, the second management entity communicates non-satisfaction of the sub-goal to the first management entity.

BRIEF DESCRIPTION OF DRAWINGS

A method and system in accordance with this invention, for identifying events within a multi-entity computer system and implementing corrective action which may be required to remedy effects of such events, will now be described, by way of example, with reference to the accompanying drawings, in which.

BEST MODE FOR CARRYING OUT THE INVENTION & INDUSTRIAL APPLICABILITY

Figure 1:
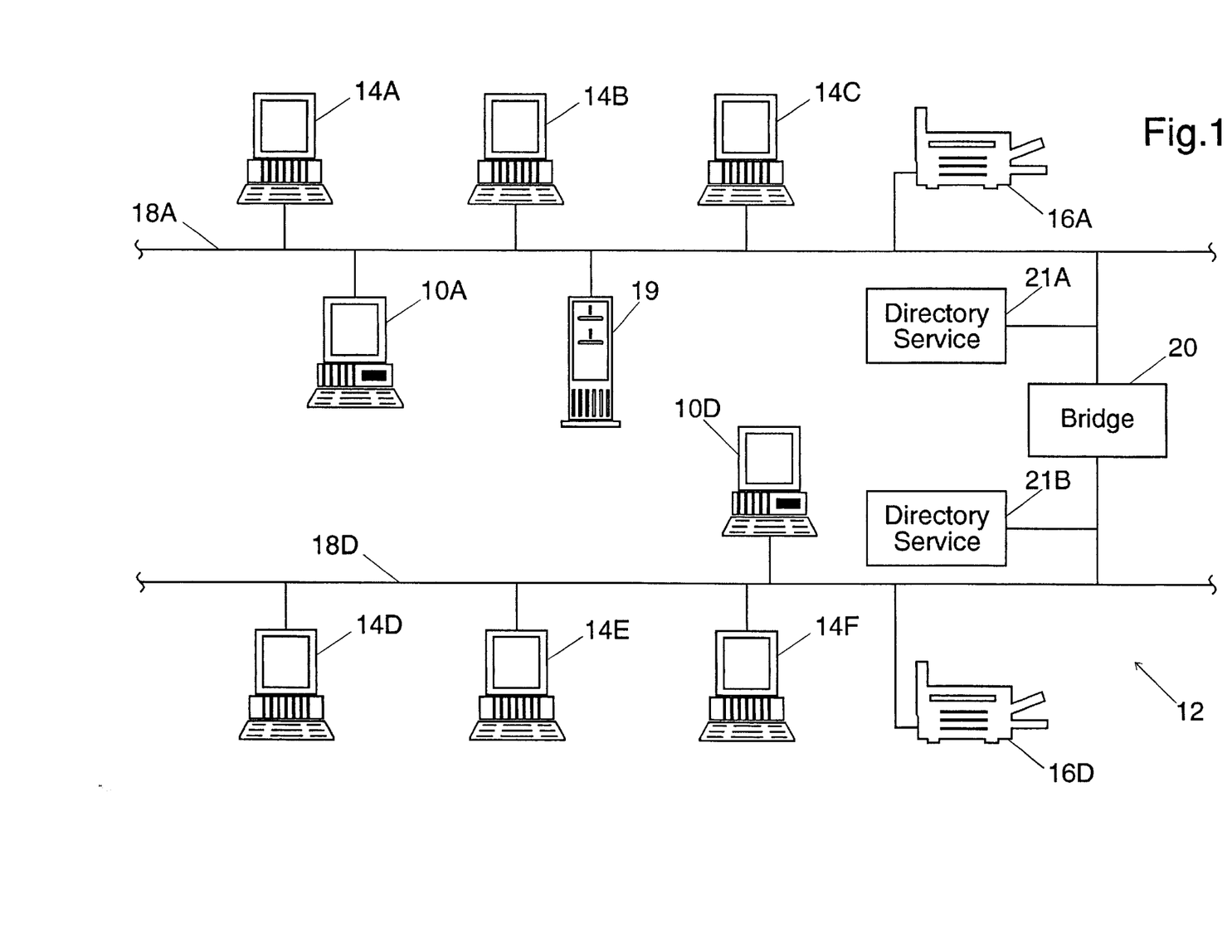
FIG. 1 is a schematic view of part of a computer system incorporating two logical sub-systems each having a respective system management apparatus.

FIG. 1 is an illustration of part of a computer system 12 whose operation is supervised with the aid of system management apparatus of the present invention. The system 12 comprises work stations (identified individually as 14A, 14B, etc.) and peripheral devices such as printers (identified individually as 16A and 16D) and a file server 19, interconnected via a network including LAN segments 18A and 18D linked via a bridge 20. A user at a work station will typically require the system 12 to provide him/her with any of several services such as logging into the computer system, running a particular application program, print spooling, electronic mail and logging off. For each of these services a system manager needs to be able to use one of the work stations 14 to perform a variety of system management tasks, including installation of the service, configuration of the service, fault diagnosis and fault fixing, and removal of the service.

For convenience the work stations 14A, 14B and 14C, together with the printer 16A, are considered as being grouped together to form one sub-system; in practice a sub-system would comprise several hundred entities such as work stations and peripheral devices, but only a few are shown in FIG. 1 for clarity. The work stations 14D, 14E and 14F, with the printer 16D, likewise form another sub-system. However the file server 19 provides file access to any of the work stations in both sub-systems; thus it cannot be viewed as being uniquely associated with either sub-system alone, and equally the system 12 cannot be partitioned into two entirely autonomous sub-systems, in view of their shared access to the file server.

It would generally be impractical to use a single management apparatus of the kind described in WO 94/09 427 to manage the complete system 12: the information processing required to supervise the total number of entities involved, such as workstations, printers and other peripherals, would overwhelm the storage and processing capacity of typical hardware which would be used to implement the management apparatus. Accordingly, it is desirable to distribute the management processing load among plural management apparatus 10A and 10D shown in FIG. 1, each apparatus being responsible for a respective sub-system. The present invention enables this to be done while allowing for the sharing of some resources, such as the file server 19, between sub-systems managed by different management apparatus. As the management apparatus 10A and 10D are essentially the same in design and operation, one representative apparatus identified by the reference numeral 10 will first be described in detail.

Figure 2:
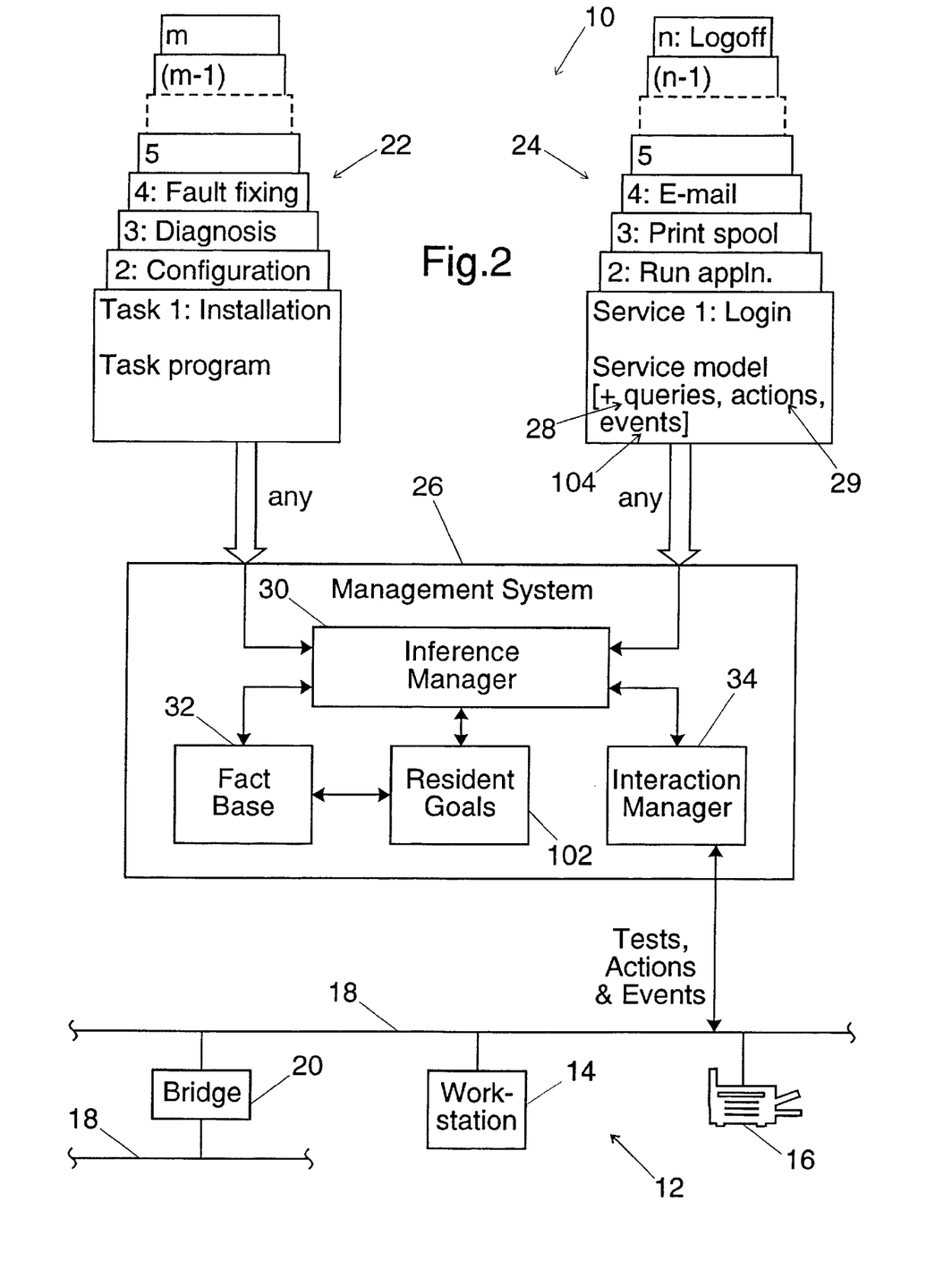
FIG. 2 is an overview diagram of the system management apparatus.

FIG. 2 is an illustration of the system management apparatus 10 in general form. This apparatus includes a set of task programs 22 (one for each of the m tasks to be performed), a set of service models 24 (one for each of the n services provided by the computer system 12), and a management system 26 constituted by the system manager's work station 14 and appropriate software. The task programs 22, service models 24 and parts of the management system 26 have been previously discussed in detail in WO 94/09 427; accordingly they will be described herein only to the extent necessary to assist a proper understanding of the present invention.

Each service model 24 is a declarative model of the service concerned and specifies the requirements needing to be met for the service to be available. These requirements or rules are set out in terms of the system's physical and logical entities associated with the service (such as printers and modems, and integers, files and operating modes), and the relationships between these entities. A service model contains no information about how it is to be used for different management tasks. Associated with each service model are queries 28 (or, as an alternative described hereinafter, external-access rules), and actions 29. Queries and external-access rules detail how information regarding the requirements specified for the service concerned may be obtained by interaction with the computer system 12. Actions detail how to initiate the carrying out of procedures which relate to the modelled service and which may be required to implement certain tasks.

As used herein, the term "declarative model" refers to an abstract description of a service, the meaning of the model being independent of any form of processing to which the model may be subject; the structure of the model, and the manner in which it is used, are not based on notions of sequence, iteration or choice (in contrast to what is typically the case with imperative models), and instead the model employs logical operators (such as AND, OR, NOT) and recursion as appropriate. Concepts of sequence, iteration and choice may well be represented in the model as part of the modelling of the service concerned but this does not affect the declarative nature of the model.

The management system 26 includes an inference engine or manager 30, a fact base 32 and an interaction manager 34. When carrying out any particular task under the control of one of the task programs 22, the inference engine 30 uses the service model 24 for the service in respect of which that task is being carried out to identify the requirements for the service, and then uses whatever information might be available to it to make certain inferences from these requirements (in particular, whether they have been met or need to be met). The fact base 32 stores facts which are already known to the management system 26 and which are therefore directly available to the inference engine 30. If desired facts are not in the fact base 32, the inference engine 30 is operative to use the queries 28 or external-access rules associated with the relevant service model 24 to cause the interaction manager 34 to interact with the computer system 12 with a view to obtaining the facts concerned directly or indirectly through experience. Furthermore, if it is necessary to modify the system 12 being managed in order to complete a task (for example, installation or removal of a service), the inference engine is operative to cause appropriate predefined actions 29 associated with the relevant service model 24 to be initiated via the interaction manager 34.

By way of illustration and using a pseudo natural language, a print spooler service model in respect of a print spooler service named lpSpooler may specify that the service is known to be available if three requirements are met:

lSpooler service is availability and satisfactory IF:

a print scheduler is running in respect of lpSpooler, and there is a valid default printer device specified for lpSpooler, and that default printer device is currently able to print.

The existence and status of the print scheduler are typically facts which are directly obtainable by means of a query or external-access rule and are then stored in the fact base 32. The existence of a valid default printer device for lpspooler can be ascertained, and its identity obtained via a variable 'pname', as follows:

lpSpooler has a valid default printer device IF:

lpSpooler has an associated default printer [printer name is put into 'pname'], and 'pname' is an acceptable printer name.

The ability of a default printer device to print can be ascertained, in the case where it is connected directly to a work station 14, as follows:

Printer can print IF:

Printer is accepting print jobs, and

Printer is enabled.

The ability of the printer to accept print jobs and its enabled/disabled status can be ascertained by means of appropriate queries or external-access rules. In the case where the printer is connected to the network 12 rather than directly to an individual work station, the model is slightly more complex; in this case the physical printer has a 'notional' printer associated with it in the work station 14, and the model becomes:

Printer can print IF:

'notional' Printer is accepting print jobs, and

'notional' Printer is enabled, and

'notional' Printer has a physical printer associated with it, and that physical printer is currently able to print.

The ability of the physical printer to print can be ascertained by invoking the printer-can-print model for that device; this procedure is if necessary repeated recursively until the printer-can-print model for a directly-connected printer is invoked (e.g. for a printer connected to a print server), at which point the status of the printer is directly determined.

If it is wished to carry out diagnosis of the print spooler service for a particular print spooler, a diagnosis task program 22 causes the inference engine 30 to examine the print spooler service model 24 and identify all the requirements that must be met. For example, if a user cannot print using the lpSpooler print spooler, then the model states that a print scheduler must be running in respect of lpSpooler, there must be a valid default printer device specified for lpSpooler (i.e. lpSpooler must have an associated default printer with an acceptable printer name), and that default printer device must currently be able to print (i.e. it must be accepting print jobs, and be enabled); the inference engine 30 proceeds, under the control of the diagnosis task program 22, to ascertain which of these requirements is not currently being met.

Should it be desired to add a new print spooler to the system, the configuration task program 22 causes the inference engine 30 to examine the print spooler service model to identify what requirements must be met for the new print spooler to be usable from elsewhere in the computer system 12; these requirements can then be met by appropriate actions on the system.

The task programs 22, service models 24, queries 28 or external-access rules, and actions 29 will all generally be written in a high-level language and compiled to object code for execution.

Figure 3:
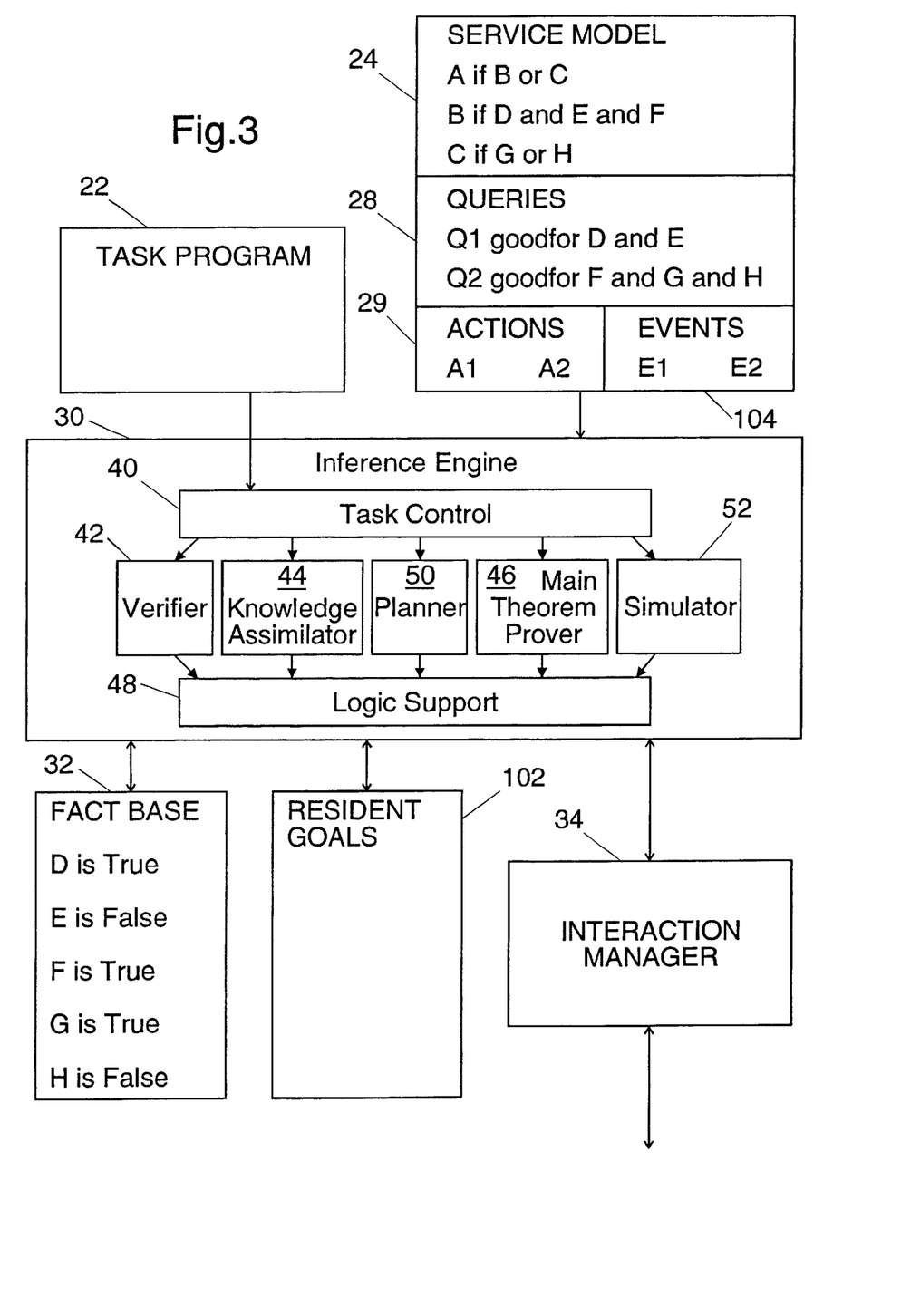
FIG. 3 is a diagram of an inference engine forming part of the apparatus of FIG. 2.

The general form of the inference engine 30 is illustrated in FIG. 3. Conceptually, the inference engine comprises a task control layer 40 for controlling the inference engine in accordance with the task program 22 supplied to it; a proof system made up of a verifier 42, a knowledge assimilator 44 and a theorem prover 46; and a logic support layer 48 (providing for unification, predicates and variables) provided by an appropriate language such as Prolog or Smalltalk, both of which are well known to persons skilled in the art.

With regard to the proof system, the verifier 42 uses a closed-world deduction system for which if something cannot be proved true it is assumed to be false; the verifier 42 does not initiate new queries. The verifier 42 is thus useful for discovering what can be true given the current state of knowledge. The knowledge assimilator 44 uses a form of abduction in order to find consistent extensions to the fact base 32 that are sufficient to explain observations arising from the results of queries 28. The main theorem prover 46 is an open-world deduction system that also considers queries; it is the core of the inference engine 30. The role of the task control 40 is to integrate the operation of the elements of the proof system in a manner to produce the results desired for the task being effected; generally, however, it may be said that if the theorem prover 46 is unable to prove a particular theorem on the basis of facts currently available in the fact base 32, it will ask the verifier 42 to look at the queries 28 to find one which will provide it with the facts desired, and then once its query has been performed, the knowledge assimilator 44 will extract as much information as possible from the results of the query and store this new information in the fact base 32 for use by the theorem prover 46.

The set of queries 28 associated with each model 24 enables information to be obtained from the system 12 being managed. Each query is 'goodfor' one or more facts (i.e. will enable that fact or facts to be ascertained), and these facts are identified with the query to permit selection of the query appropriate for a desired fact.

A query works by interacting with the system 12 being managed, and then syntactically analysing the resultant response into tokens which are then related to the contents of the associated service model 24. In the present embodiment, the interaction manager 34 is responsible for running the query, whilst further semantic analysis of the response is carried out by the knowledge assimilator 44 which is also responsible for updating the fact base 32.

As noted above, it is also possible to use external-access rules (described below) in place of queries; in this case the external-access rules are used, like the other rules in a service model 24, by the inference manager 30.

In either case, three main types of interaction are possible. Firstly, existing information-providing services of the system 12 may be used to provide directly the required information (though generally packaged with other information and requiring syntactic extraction). Secondly, a query or external-access rule may exercise a particular capability of the system 12 which although not directly supplying the required information enables the knowledge assimilator 44 to infer certain facts from the observed results. Thirdly, it is possible to write specific agent programs running on particular machines of the system being managed, and to arrange for these agents to provide specific answers to particular queries or external-access rules. Whilst such agents could provide powerful analysis tools, the need to add to the system being managed has practical drawbacks and this approach is therefore not preferred.

Figure 4:
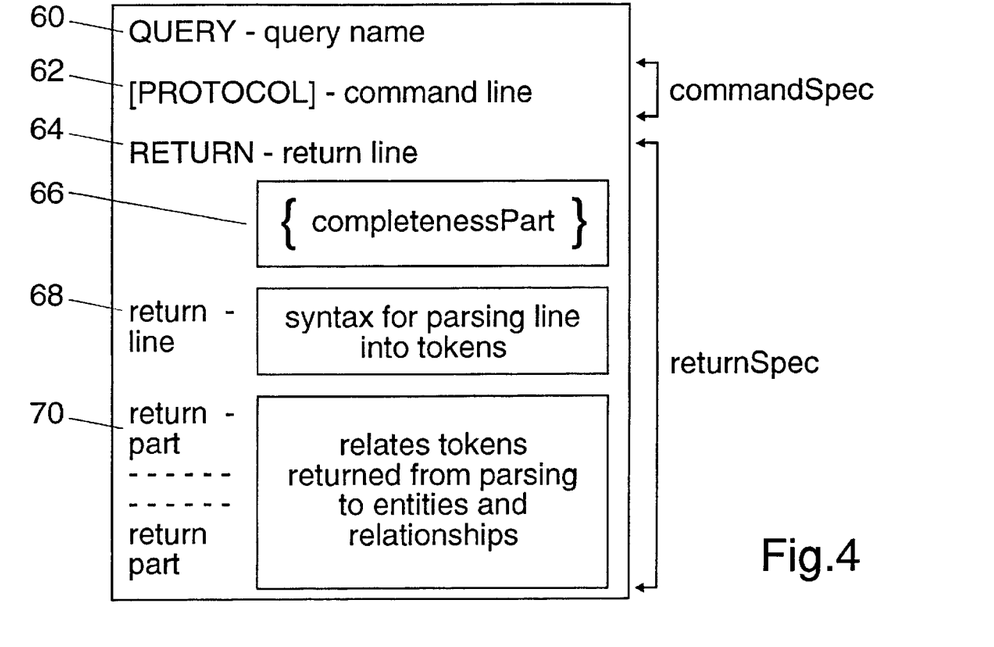
FIG. 4 is a diagram illustrating the format of a query usable to obtain information from the computer system being managed.

The general format of a query 28 is illustrated in simplified terms in FIG. 4. The query 28 is allotted a unique name 60. The action to be performed by the managed system 12 is specified in a command line 62 that constitutes the 'commandSpec' of the query, using a syntax that depends on the particular command or system management language used, which is identified in a prefix shown as [PROTOCOL] in FIG. 4. The remaining part of the query is the 'returnSpec' describing what response can be expected to result from the action initiated by the command line 62 and how this response relates to the relevant contents of the associated service model 24. The 'returnSpec' gives the general form of the response ('returnline' 64) in part of a production named RETURN that also contains a list 66 (referred to as the 'completenessPart') specifying the items for which complete information is available. The 'returnline' 64 is then syntactically specified (reference 68) to derive a number of 'returnParts' which are then related to the contents of the service model (reference 70). The facts for which a query is 'goodfor' are implicitly identified in section 70 of the query and typically an explicit list of these facts will be generated when the query is compiled.

An external-access rule is generally similar in layout to the definition discussed above of the requirements associated with availability of a service. Thus, for example, determining the enabled/disable status of a printer requires access to an entity (the printer) external to the management apparatus 10 itself; the relevant external-access rule could be defined as follows:

'printer' is enabled IF:
  'snmp' mibnumber '.1.3.6.1.4.1.11.3.9.1.1.2.17.0.2' has
    value 'number'
  'number' equals '0'

The line beginning 'snmp' invokes a method, that is a module which contains instructions enabling, for example, interactions with the computer system 12 according to some predefined protocol in order to obtain specific information about an entity in the system. In this case the method contains instructions for sending a query in accordance with Simple Network Management Protocol (SNMP) conventions to a printer to obtain a response indicating that printer's status. The method extracts the status information from the response and sets the value of the object 'number' accordingly.

Another example of an external-access rule examines a file containing a list of authorized users of a system to identify whether a user requesting access is authorized:

'machine' has user called 'name' password 'pwd' phone-no 'phone' IF:
- 'file' called '/etc/passwd'
- 'cat'+'file' is 'command'
- 'remsh' command 'command' on 'machine' as 'oursystem' is 'contents'
- 'contents' line 'line'
- 'line' chop ':' is 'name' at '1'
- 'line' chop ':' is 'pwd' at '2'
- 'line' chop ':' is 'phone' at '3'

This rule invokes the following method:
- 'contents' line 'line' IF:
- 'contents' chop '\n' is 'line' in order to extract each line successively from the text in 'contents' (i.e. the text in the file/etc/passwd). The instructions implementing this method must therefore maintain an index of the position reached in the text after an invocation of the method, in order to respond correctly to successive invocations.

When an external-access rule is used, its component parts are themselves executed until a method (i.e. a base level component) is encountered and invoked to obtain the required information about the computer system 12 to update the fact base 32. The information obtained by a method invoked in an external-access rule may in principle already be available in the fact base 32, in which case it is preferable to examine the fact base before imposing an unnecessary burden on the system 12 by actually invoking the method. Accordingly the external-access rule may be designed to treat the relevant fact as 'persistent', in which case the fact base is examined first.

External-access rules enable the interaction between the inference engine and the computer system 12 to be implemented in a more detailed and controlled manner than is possible with queries, using the same notation and syntax as is used for other rules in a service model 24. In the subsequent description it will be assumed for the sake of consistency that information is obtained from the system 12 by means of queries; however, this does not imply that only queries are usable in these instances, and it should be understood that external-access rules may be used instead.

A simple example of how the theorem prover 46 carries out reasoning on the basis of the rules given to it in a service model 24 and having regard to facts available in the fact base 32 will now be given.

As described above, each service model 24 contains statements relating to the entity or entities relevant to that model and these statements will generally be used to form a number of conditional relationships between those entities specifying, for example, that a service entity is available if certain conditions are met. Thus, with reference to the service model 24 of FIG. 3, there may be truth valued statements A–H in the service model organized into three rules:
- A if B or C
- B if D and E and F
- C if G or H Statement A represents that the service concerned is available if statement B or statement C is true. The second rule given above then sets out the conditions to be fulfilled for statement B to be true whilst the third rule gives the conditions for statement C to be true.

Figure 5:
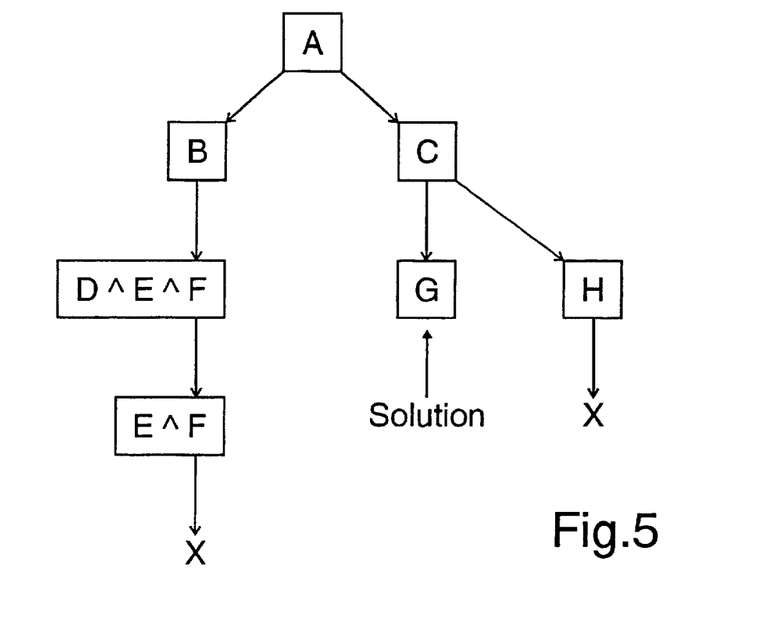
FIG. 5 is a search tree illustrating operation of the inference engine of FIG. 3 in respect of an example service model, given a set of predetermined facts.

Consider first the situation in which the fact base contains the facts that D, F and G are true but E and H are false. Working with the above rules and these facts, the main theorem prover 46 can now deduce whether or not the service represented by model 24 is available—that is, whether A is true. This proof proceeds as follows (see FIG. 5):

(1) Since there is no fact for A but there is a rule, the search for a solution expands into two partial solution nodes.

(2) Now consider B. Again there is no fact, but there is a relevant rule so the search is again expanded.

(3) Now consider D, E, F. There is a fact for D, so the next partial solution is node E, F.

(4) Now consider E, F. E is known to be false, so this branch fails.

(5) Backtracking to the next un-expanded partial solution node (that is, C), there is no fact for C, but there is a rule, so the search is expanded.

(6) Now consider G. This is known to be true, so a solution has been found.

This example is a simple depth-first search over the solution space. Other search strategies are, of course, also possible such as a "best first" strategy.

Figure 6:
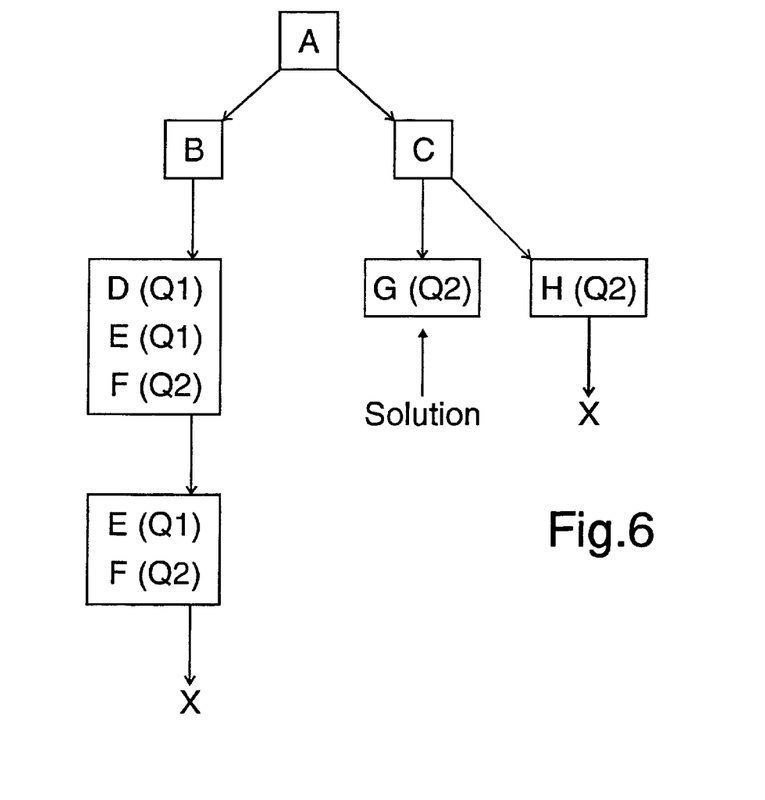
FIG. 6 is a search tree illustrating operation of the inference engine of FIG. 3 in respect of the same service model as for FIG. 5, where queries are used to elicit facts.

Consider next the situation where there are no relevant facts in the fact base 32. However, a set of queries is associated with the model 24, providing two queries Q1 and Q2; query Q1 is 'goodfor' (that is, will give the value of) D and E, and Q2 is 'goodfor' F, G and H. In this case, the proof proceeds as follows (see FIG. 6):

(1) The proof of A begins as before until the partial solution node D, E, F is reached. This time there is no fact for D but there is a query Q1. So query Q1 is executed and this puts the facts 'D is true' and 'E is false' into the fact base 32, enabling the next partial solution node to be created.

(2) Now consider E, F. There is now a fact for E in the fact base; this fact (E is false) causes this branch to fail.

(3) Backtracking to the next un-expanded partial solution node (that is, C) the search is continued as before.

(4) When G is considered, there is no fact for it, but there is a query Q2. When this is executed the facts 'F is true', 'G is true' and 'H is false' are added to the fact base 32, resulting in a solution.

The selection of the appropriate query and the extraction of information from the result of a query involve the verifier 42 and knowledge assimilator 44.

Actions 29 that may need to be performed in order to enable a particular task to be completed are defined for each service model in much the same way as a query but with a simpler basic format:
- ACTION—action name
- COMMAND—command line
- PRE—preconditions for the action
- POST—post-conditions (i.e. the effect of the action)
- INVALIDATE—variables invalidated by the action The command line will specify a command which can be executed directly by the system 12, together with identifiers for the items to be acted on (for example, the command line may contain a variable of declared type for specifying the machine on which the action is to be carried out). The preconditions specified in PRE are the conditions that must be true before the action can be carried out. The post-conditions specified in POST define the effect of the action; it is these post-conditions that the inference engine 30 will search when seeking to identify the action 29 appropriate to effecting a particular task in relation to the service model 24 for which the action is defined. INVALIDATE identifies the variables invalidated by the action, this information being used to remove from the fact base 32 any facts relying on the invalidated items.

As previously explained, the role of each task program 22 (FIG. 2) is to adapt the operation of the inference engine 30 to the task to be performed. An example diagnosis task program is given below in a pseudo natural language form for ease of understanding:

```
DIAGNOSIS TASK
WHILE no solution found DO
    Theorem Prover : search for solution;
    IF more information needed THEN
        REPEAT find a query UNTIL Verifier: prove pre-conditions END
        perform query;
        IF query passes THEN
            Knowledge Assimilator: assimilate query pass reasons
        ELSE
            Diagnosis Task: on query failure reasons
        END
    END
END
```

The above task program, which can be used in conjunction with any service model 24, searches for a solution to whether the service concerned (as represented by an entity of the corresponding model) is available. This search will proceed through all the conditions specified in the relationships associated with the relevant service entity until either it is proved that a required condition is not met or it is proved that all conditions are met and the service is available. In conducting the search for a solution, queries may be used to ascertain facts.

Considering the diagnosis task program in more detail, the main theorem prover 46 (FIG. 3) is first called upon to search for a solution. If during the course of this search the theorem prover 46 is unable to proceed because a required fact is not present in the fact base 32, then the verifier 42 is used to select a query 28 that will elicit the desired fact from the system. The selected query is then executed (by the interaction manager 34). If the query is successfully carried out, the results from the query are assimilated into the fact base 32 by the knowledge assimilator 44 and the program then loops for the theorem prover 46 to continue its search using the newly established facts. However, if the query fails (that is, is not successfully executed) then the diagnosis task is recursively called to establish the reason for this failure.

If there is a problem with a service being diagnosed, the above diagnosis task program will terminate when the theorem prover 46 first comes across a fact proving that a requirement for the service to be available has not been met. Because the facts assimilated into the fact base 32 are generally low level facts, the termination of the program at this stage will normally be acceptable, as the termination point will indicate the low-level fact resulting in service non-availability and this fact will generally be readily translatable into the computer system fault (including absence of a resource) concerned. However, where the fact base 32 stores high-level facts it is desirable that the diagnosis task program does not terminate at a high-level fact proving service non-availability, but that it continues to decompose this fact to derive the underlying cause as expressed in a low-level fact. This can be readily achieved by enclosing the above diagnosis task program within a 'WHILE' loop of the form:

```
WHILE failure explanation possible DO
    Diagnosis Task
END
```

In this case, whenever the core diagnosis task terminates on finding a fact proving service non-availability, it is asked to find a solution proving that fact (and ignoring its presence in the fact base 32). This process repeats until no further explanation is possible (as indicated by the absence of any relevant query 28).

If the above additional WHILE loop is not limited to failure explanation, but is used to explain any solution, then the expanded diagnosis task can also be used to provide a full check on all conditions (high-level and low-level) required for a particular service.

A further example of a task program is given below in relation to a monitoring task:

```
MONITORING TASK
    WHILE Diagnosis Task: proves monitored goal true DO
        delay for monitoring interval
    END;
```

Diagnosis Task: on whole Service As can be seen, the monitoring task uses the diagnosis task in its implementation.

Specific measures may be taken to ensure, as far as reasonably possible, the validity of any facts held in the fact base 32. For example, each query 28 could be allocated a 'lifetime' being the time for which any facts derived by running the query can be considered valid. At the expiration of the query lifetime, all derivative facts (and any further facts based on them) are deleted from the fact base 32. With such an arrangement, monitoring of system elements can be implemented by using queries 28 to derive facts on those elements, with these queries having a lifetime corresponding to the monitoring interval; upon such a query reaching the end of its life, the facts of interest will be removed from the fact base 32 and this can be used by the monitoring task as a trigger for re-initiating the corresponding query 28.

Further details of the system as so far described are given in WO 94/09 427 (incorporated herein by reference), in particular in relation to the content of service models 24 and queries 28.

The system management apparatus described in WO 94/09 427 and summarized above is able to analyze the operation of the computer system 12, and for example to locate and identify, in response to intervention by the system manager (by activation of the diagnosis task program 22), service-related requirements whose absence is causing failure of a system service.

Additionally the facility for periodically re-executing a query 28 as described above, in response to expiration of the lifetime of the query and deletion from the fact base 32 of the facts derived therefrom, enables for example the status of system elements to be monitored on a continuing basis, and either confirmed as continuing to be available or reported as needing remedial attention by the system manager if re-execution of the query no longer yields facts enabling the availability of the service to be proved.

However it has now been found desirable to provide additional facilities in the system management apparatus 10, to enhance the system's ability to detect changes in the system's status and to provide the possibility of automatic reconfiguration to remedy adverse effects of such changes.

To this end, as shown in FIG. 2, the management system 26 also includes a resident goals store 102. This store contains assertions of goals that the system should continue to achieve, and which the management system should verify can still be satisfied following the occurrence of events which might affect those goals. The goals will typically depend on lower-level facts in the fact base 32. A report of occurrence of an event will contain information from which one or more of these lower-level facts can be confirmed or contradicted; if a fact is contradicted, consequent updating of the fact base 32 in respect of that fact will trigger re-evaluation of whether a goal which is dependent on that fact can be satisfied.

An example of a resident goal is the continued availability of the print spooler service lpSpooler discussed earlier, the definition of which corresponds to the content of the service model for that service, i.e. (in pseudo natural language):

lpSpooler service is ok IF:
a print scheduler is running in respect of lpSpooler, and
there is a valid default printer device specified for lpSpooler, and
that default printer device is currently able to print.

The basic facts upon which this goal depends include the continued running of the print scheduler, the continued ability of the relevant printer device to accept print jobs, and the continued enabled status of that printer device. When a resident goal is first entered into the resident goal store 102 by the system manager, using the work-station 14, the inference engine 30 attempts to prove that the goal can be satisfied, by reference to the service model 24, the fact base 32 and using queries as described above. In the course of this proof links are established between the goal in the resident goal store 102 and the basic facts upon which it depends, in the fact base 32; however, to conserve system resources, links with any intermediate facts which relate the basic facts to the goal (such as the default printer being able to print) do not need to be stored.

In addition the relevant service model 24 is extended to contain a definition of one or more events 104 the occurrence of which can confirm or contradict a fact in the fact base 32. These events could include the halting of a print scheduler (in case it is the scheduler upon which lpspooler depends) and a signal that a printer has changed status to disabled (in case it is the default printer for lpSpooler), and these events would be included in the print spooler service model.

Figure 7:
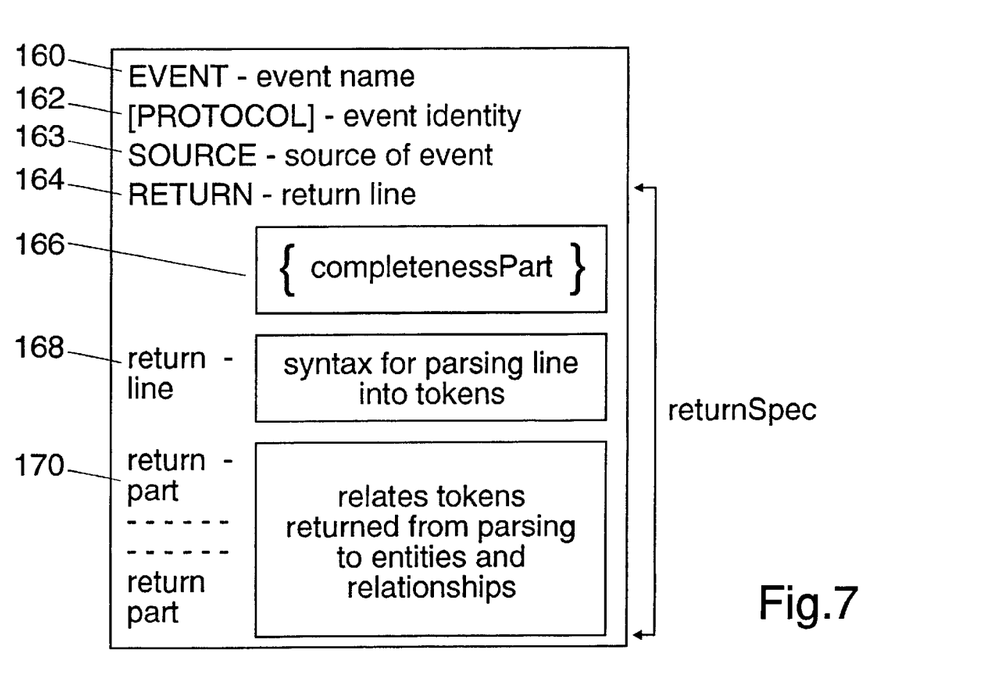
FIG. 7 is a diagram illustrating the format of an event definition usable to define events within the computer system for which resulting effects and possible corrective action are to be identified.

The general format of definition of an event 104 is illustrated in FIG. 7, and is similar in many respects to the format of a query 28. The event is allotted a unique name 160. The actual nature of the event is identified in an identification line 162, using a syntax that depends on the particular command or system management language used, which is itself identified in a prefix shown as [PROTOCOL] in FIG. 7. Thus, if SNMP is being used, this line might read SNMP::='.1.3.6.1.4.1.11.2.3.9.1.1.2.17.0' where the string of digits defines an event in accordance with SNMP conventions. A source line 163 identifies the network entity (e.g. a printer device) with which the event in question is associated. The remaining part of the event is the 'returnSpec' describing what information can be expected to be available in connection with the event identified in the identification line 162 and how this information relates to the relevant contents of the associated service model 24. The 'returnSpec' gives the general form of the information ('returnline' 164) in part of a production named RETURN that also contains a list 166 (referred to as the 'completenessPart') specifying the items for which complete information is available (e.g. indicating that if there is no specific indication that an assertion is true, it may be assumed to be definitely false). The 'returnline' 164 is then syntactically specified (reference 168) to derive a number of 'returnParts' which are then related to the contents of the service model (reference 170). The facts which may be derived from the information available for the event are implicitly identified in section 170 of the event and may be extracted by application of an appropriate parser as described below.

When events are specified for monitoring by the system manager, the need for occurrence of those events to be reported to the management system 26 is recorded. In the case of a device or service which supports SNMP this may be done by registering the need for reporting of the event with the device or service (e.g. the need to report change of status to disabled can be registered with a printer device which supports SNMP). If a system entity does not itself have the capability of registering the need to report events (e.g. a simple desktop computer), the event may instead be registered with a system event monitor of known kind which monitors the system for predefined events and provides a report when it detects their occurrence.

Upon occurrence of an event a message reporting it is sent by the device or service in question, or by the system event monitor, to the interaction manager 34. This message will have a syntax determined by the protocol in use (e.g. SNMP), and it is inspected by the interaction manager 34 to identify the kind of message involved. This information is then passed to the inference engine 30.

The knowledge assimilator 44 in the inference engine 30 receives the event message from the interaction manager 34 and applies semantic analysis to the message to identify facts in the fact base 32 to which the message is pertinent. To this end the knowledge assimilator 44 contains stored models of typical messages, and tables of key words and features which may occur in these messages. Comparison of the received message with these models and tables enables the knowledge assimilator to select an appropriate parser matching the structure of the message, with which it analyzes the message to divide it into its constituent elements and identify the basic facts it contains (e.g. the fact that a printer has changed status to disabled).

These extracted basic facts are supplied to the fact base 32 to update its contents. In the case of facts which have been contradicted and upon which one or more goals depend, the links between the updated facts and goals in the resident goals store 102 cause the inference engine 30 to attempt once more to prove that each affected resident goal is still satisfied; this attempted proof involves cooperation of the verifier 42, knowledge assimilator 44 and main theorem prover 46, using queries if necessary, in the same manner as described above. If the resident goal is still satisfied, no further action is needed.

If the attempt by the inference engine 30 to prove satisfaction of a goal following occurrence of an event fails, this engine then endeavours to identify one or more actions 29 which if executed will result in satisfaction of the goal in a different manner. Thus, for example, if the event relates to the default printer device for lpSpooler changing its status to disabled, in which case the lpSpooler resident goal cannot be satisfied as it stands, it may be possible to re-satisfy the goal by changing the default printer device to select another printer which is enabled.

To this end, the inference engine 30 also contains a planner 50 and a simulator 52. Under the coordination of the task control layer 40, the planner 50 examines the actions 29 contained in the relevant service model 24, seeking any whose effect will enable the resident goal to be satisfied. For each action the planner first checks its preconditions against the contents of the fact base 32, to check that the necessary conditions for that action to be carried out are true. If so, the simulator 52 temporarily and reversibly alters the fact base 32 according to the effects defined in the post-conditions associated with the action, to simulate the conditions which would exist following execution of that action. The verifier 42, knowledge assimilator 44 and main theorem prover 46 then test again whether the resident goal would now be satisfied. If the test is unsuccessful the temporary changes to the fact base 32 are reversed, and another candidate action is tested. If a combination of actions is found which is potentially relevant to the resident goal in question, the inference engine 30 examines their pre- and post-conditions to determine the most effective sequence for executing those actions.

If the inference engine 30 successfully locates an appropriate action or combination of actions, it causes the interaction manager 34 to execute those actions on the computer system 12, thereby causing the necessary actual changes in the configuration of the system to re-satisfy the resident goal. On the other hand, if no appropriate action or combination of actions can be found, the diagnosis task program described above can be invoked to provide a description of reasons why the resident goal can no longer be satisfied.

A single system management apparatus 10 as described above can typically provide effective management for a computer system or sub-system comprising up to a few hundred stations and peripherals. However, there are several reasons why it is undesirable to attempt to use the apparatus to manage a larger number of computer system devices. If the number of devices is too large, the aggregate information which the apparatus must store about all them may overwhelm the data storage capacity of the apparatus, and the need to process information about a proportion of the devices effectively simultaneously may overload the processing capacity of the apparatus. If the devices are scattered over a physically large area communication delays to more remote devices may introduce further difficulties. It may be desirable to be able to specify different system management goals in respect of similar services in different parts of the system, for example to suit the requirements of different groups of users. In addition, concentrating all the management functions of a large system in a single apparatus renders it vulnerable to major dislocation in the event of a failure in that single apparatus. Accordingly, for large computer systems (e.g. in excess of the order of a hundred devices), it is preferable to consider the system as being notionally split into several sub-systems, each sub-system containing up to approximately a hundred stations and peripherals and having a respective management apparatus, as shown at 10A and 10D in FIG. 1.

However, although the physical entities comprising a computer system can in principle each be assigned to one or other of several management apparatus, for example on the basis of physical location or ownership, in practice the services provided by these entities do not conveniently divide in a corresponding manner. Thus, for example, the file server 19 shown in FIG. 1 may be considered, by virtue of its physical location, as forming part of the sub-system including the workstations 14A–14C and the printer 16A, and therefore be managed by the management apparatus 10A. However, this file server may also provide support (e.g. in the form of executable applications programs, font definition files and special device drivers) for entities in another sub-system, such as the workstation 14D and the printer 16D. In this case it is difficult to decide whether the file server 19 should in fact be managed by the apparatus 10A, or rather by the management apparatus 10D associated with this other sub-system. Associating the file server 19 with both management apparatus 10A and 10D would involve wasteful duplication, could lead to overloading of storage and processing resources as explained above if this solution is adopted for many entities, and could also lead to the file server receiving conflicting instructions from the management apparatus 10A and 10D.

To resolve this problem each management apparatus 10 is provided with a capability to communicate a goal to another such apparatus 10; in this context the apparatus which communicates the goal is referred to herein as the 'primary' apparatus, and the apparatus which receives it is referred to as the 'secondary' apparatus. The secondary apparatus attempts to satisfy the goal and reports the outcome back to the primary apparatus. In attempting to satisfy the goal the secondary apparatus may itself communicate the same goal or a related sub-goal to a further apparatus 10. Thus there can be a chain of goals and/or sub-goals, although the primary apparatus which initiated the chain typically does not receive information about any goal except the one which it first communicated to the secondary apparatus.

If the goal communicated by the primary apparatus is a resident goal for that apparatus, or supports another goal for that apparatus which is resident, the secondary apparatus likewise treats the communicated goal as a resident goal. It then assumes responsibility for monitoring, autonomously of the primary apparatus, for events which might affect satisfaction of the communicated resident goal. If an event occurs which prevents this resident goal from continuing to be satisfied, the secondary apparatus attempts to find another way of satisfying the goal, as described above; this attempt may again involve communicating goals or sub-goals to other management apparatus. If the communicated resident goal cannot be satisfied, the secondary apparatus reports this situation back to the primary apparatus, which can then treat the report as an event, triggering either an attempt to satisify the goal in some other way or the reporting of a fault.

Each management apparatus 10 maintains a list in a memory cache of the devices which it is assigned to manage. When a device is added to the sub-system managed by an apparatus 10, the system manager provides information about the device, such as its identity and its capabilities, to the management apparatus 10; likewise, if a device is removed from the sub-system, the system manager records this information in the management apparatus.

When a management apparatus 10 starts operation after any kind of interruption, or whenever there is a change in the set of devices it is managing, it communicates a summary of the identities of these devices to directory services 21A, 21B (FIG. 1). Each directory service 21A, 21B enables a management apparatus 10 to determine which other such apparatus 10 is responsible for the management of, and therefore has information about, any particular device in the system 12.

As explained previously, the inference manager 30 in a system management apparatus 10 (e.g. the apparatus 10A) which has a resident or non-resident goal to be satisfied in respect of a service (e.g. the print spooler service provided using the printer 16D) will attempt to accomplish this by performing inferencing operations on the relevant service model 24 and by referring to its associated fact base 32. In the course of this attempt the inference manager 30 will determine that it alone cannot satisfy the goal. This may be because some of the assertions involved concern entities in another part of the computer system, or because required facts about the printer 16D are not available to the inference manager (e.g. they are not present in the fact base 32) and it is unable to obtain these facts directly because that printer is not included in the list of devices for which the apparatus 10A is responsible.

Accordingly the inference manager 30 sends a message to the directory service 21A, for example via the interaction manager 34, requesting the identity of the management apparatus 10 which is responsible for the printer 16D. The directory service 21A sends a message in reply identifying the management apparatus 10D (e.g. by giving its full network address or an identification conforming to a standard such as the Common Object Request Broker Architecture—CORBA).

Figure 8A:
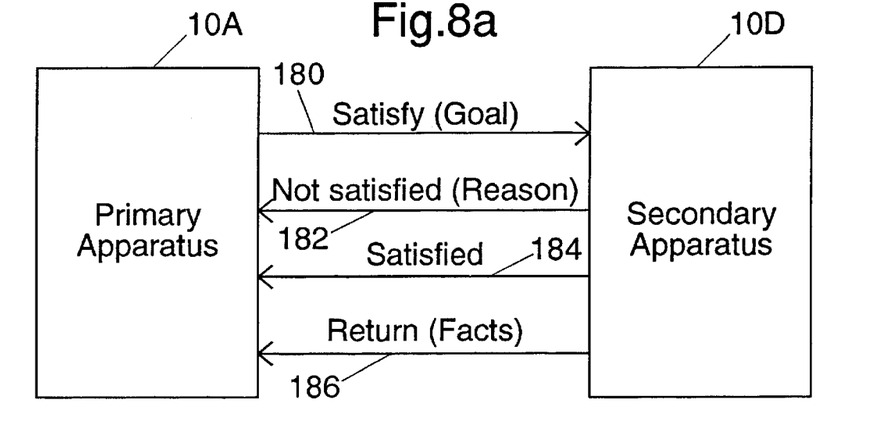
FIGS. 8a–8c are diagrams of a protocol for communicating information about resident goals between different management apparatus.
Figure 8B:
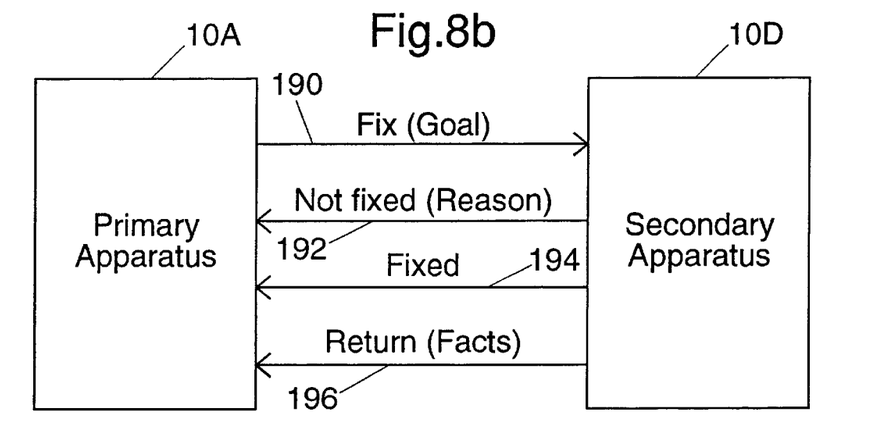
Figure 8C:
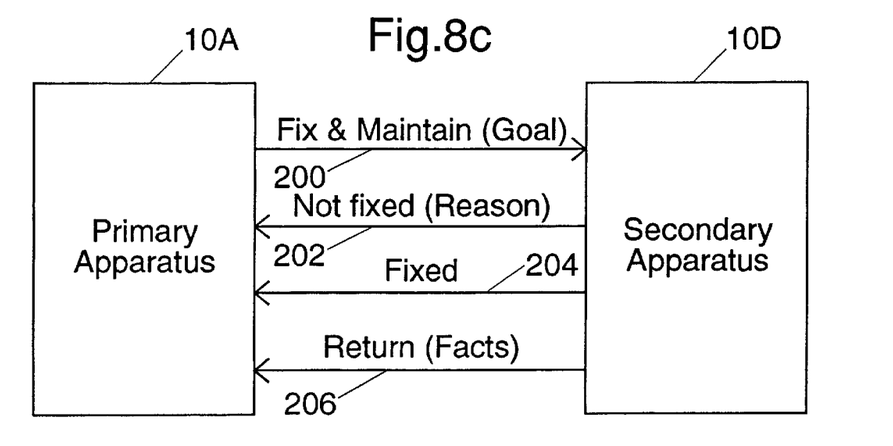

The inference manager in the primary apparatus 10A then sends a message to the inference manager in the secondary apparatus 10D identifying a goal to be satisfied and related information. As indicated at 180 in FIG. 8a, this message may contain a request for the secondary apparatus 10D to test whether the goal which will yield the fact(s) required by the primary apparatus 10A about the printer 16D is satisfied (e.g. if the primary apparatus 10A wishes to establish whether the printer 16D is able to print, the goal could be 'verify ability to print using the printer 16D'). If in addition the primary apparatus 10A requires action to be taken by the secondary apparatus 10D in an active attempt to ensure the goal is satisfied (i.e. fix any problem preventing the goal from being satisfied), then as shown at 190 in FIG. 8b the message will indicate this requirement. If the goal is further to be treated as a resident goal by the secondary apparatus 10D, the primary apparatus indicates this, as shown at 200 in FIG. 8c.

Upon receiving the request message the inference manager in the secondary apparatus 10D attempts if possible to prove that the goal identified in the message is satisfied, by performing inferencing operations on the relevant service model 24 and by referring to its own associated fact base 32. If the primary apparatus 10A simply requested whether the goal is satisfied (FIG. 8a), the secondary apparatus 10D communicates the outcome back to the primary apparatus, as indicated at 182 and 184, with an indication of the reason for any failure, and, as indicated at 186, an indication of any facts which were relevant to the outcome. If the secondary apparatus 10D has no facts available to it that are relevant to the goal, or if its memory and/or processing resources are already fully committed to existing tasks, it informs the primary apparatus of this in the reason indication.

If the goal is not satisfied and the primary apparatus 10A has indicated that it requires action to be taken to satisfy it (FIG. 8b), the inference engine 30 in the secondary apparatus 10D uses its planner 50 and simulator 52 as described above to find sequences of actions whose effect will enable the goal to be satisfied. For each sequence of actions found in this way, the inference engine checks whether any facts that would be changed by that sequence are linked to existing resident goals for the secondary apparatus 10D and if such a link exists the sequence is rejected; if every sequence tested is rejected in this way the goal requested by the primary apparatus 10A conflicts with an existing goal for the secondary apparatus 10D, which therefore notifies the primary apparatus 10A of this situation, as indicated at 192. Otherwise the secondary apparatus 10D implements the sequence of actions which will cause the goal to be satisfied, and notifies the primary apparatus of the result as indicated at 194 and 196.

In the case where request from the primary apparatus 10A requires the goal to be treated by the secondary apparatus 10D as a resident goal (FIG. 8c), and assuming no conflicts or other problems have been encountered in respect of the goal, the inference manager 30 in the secondary apparatus 10D enters the goal into its associated resident goal store 102 as described above; the information stored about the goal include the identity of the primary apparatus 10A which requested the goal, and a lifetime for which the goal must be satisfied. Facts whose validity affect the goal are likewise added to the fact base 32 if necessary, with links to that goal. The secondary apparatus 10D sends a message to the primary apparatus 10A acknowledging receipt and implementation of the request (204), together with any facts requested by the primary apparatus 10A and/or an indication of whether any requested action was taken to satisfy the goal (206).

Thereafter the secondary apparatus 10D reacts, autonomously of the primary apparatus 10A, to any event which affects facts upon which the communicated resident goal depends. If as a result of an event the communicated goal is no longer satisfied, the inference engine in the secondary apparatus 10D attempts to find an alternative way of satisfying the goal, as described above.

In the case where the secondary apparatus 10D is unable to find another way of satisfying the communicated goal, it sends a message (202) to the primary apparatus 10A indicating that this is the case. This message is itself treated by the primary apparatus 10A as an event, triggering an update of its own fact base and then a check of whether any resident goals in the primary apparatus 10A are affected.

What is claimed is:

1. A system management method of monitoring occurence of and attempting to remedy effects of events affecting a service provided by a computer system made up of cooperating physical and logical entities, said method comprising the steps of:

providing for said service a declarative model specifying requirements needing to be met for said service to be available, said requirements being set out in terms of the entities required and their inter-relationships;

specifying in respect of at least one aspect of said service a goal to be satisfied by said system;

providing a fact base for holding facts relating to the system;

identifying at least one fact which relates to the system and upon which said goal depends, and including that fact in said fact base;

determining whether said goal is satisfied and thereby establishing at least one link indicating a dependency relationship between said goal and said at least one fact, and including said link in said fact base;

defining at least one event which can occur in the system and whose occurrence in the system can affect validity of said fact; and detecting occurrence of said event, and thereupon:
    determining whether said fact is valid or invalid;
    if said fact has become invalid, determining whether said goal is still satisfied by performing inferencing operations on the declarative model by referring to said fact base so as to ascertain whether a requirement relevant to said coal is met by the system;

if said goal is no longer satisfied, seeking an operation which will enable said goal to be re-satisfied; and performing said operation.

2. The method of claim 1, wherein the step of determining whether said goal is satisfied is performed when said goal is first provided, wherein said links are established during that step.

3. The method of claim 1, including the step of inspecting said fact base for any link relating to a fact when that fact is updated, and, if such a link is found, determining whether a goal indicated by that link is still satisfied.

4. The method of claim 1, including the step of analyzing occurrence of said event to identify and establish validity of a fact related to the event.

5. The method of claim 1, including the step of testing whether an operation will enable said goal to be re-satisfied by temporarily updating said fact base to indicate consequences of effecting that operation, and determining whether said goal is satisfied by reference to said fact base in its temporarily updated state.

6. The method of claim 1, including the step of providing a description of reasons for a goal not being satisfied, if no operation can be found which will enable said goal to be re-satisfied.

7. The system management method of claim 1 wherein said event affects availability of the service.

8. System management apparatus for monitoring occurrence of and attempting to remedy effects of events affecting a service intended to be provided by a computer system made up of cooperating physical and logical entities, said apparatus comprising:
  a declarative model specifying requirements needing to be met for said service to be available, said requirements being set out in terms of the entities required and their inter-relationships;
  an inference engine for carrying out inferencing operations in relation to said declarative model;
  a specification of a goal to be satisfied by said system in respect of at least one aspect of said service;
  a fact base for holding facts relating to the system;
  an identification of at least one fact which relates to the system and upon which said goal depends, said fact being included in said fact base;
  at least one link being established by determining whether said goal is satisfied, said link indicating a dependency relationship between said goal and said at least one fact, and said link being included in said fact base;
  a definition of at least one event which can occur in the system and whose occurrence in the system can affect validity of said fact; and
  means for detecting occurrence of said event, and thereupon:
    determining whether said fact is valid or invalid;
    if said fact has become invalid, causing said inferencing engine to perform inferencing operations on the declarative model and causing reference to be made to said fact base for ascertaining whether a requirement relevant to said goal is met by the system, and determining whether said goal is still satisfied;
    it said goal is no longer satisfied, seeking an operation for enabling said goal to be re-satisfied; and
    performing said operation.

9. The system management apparatus of claim 8 wherein said event affects availability of the service.

10. The apparatus of claim 8, wherein the determination of whether the goal is satisfied is performed and the links are established when the goal is first provided.

11. A system management method of monitoring occurrence of and attempting to remedy effects of events in a computer system made up of cooperating physical and logical entities, said entities being logically arranged into groups and each group including a management entity, and said events affecting a service provided by entities in a first group, said method comprising the steps of:
  providing for said service a declarative model specifying requirements needing to be met for said service to be available, said requirements being set out in terms of the entities required and their inter-relationships;
  specifying in respect of at least one aspect of said service a goal to be satisfied by said system;
  identifying, in a first management entity in said first group, that satisfaction of said goal requires a sub-goal to be satisfied, and that satisfaction of said sub-goal involves system entities in a second group different from said first group;
  communicating to a second management entity in said second group a requirement to determine whether said sub-goal is satisfied;
  providing a fact base for holding facts which relate to the second group;
  identifying, in said second management entity, at least one fact which relates to said second group and upon which said sub-goal depends, and including that fact in said fact base;
  determining, in said second management entity, whether said sub-goal is satisfied and thereby establishing at least one link indicating a dependency relationship between said sub-goal and said at least one fact, and including said link in said fact base;
  defining, in said second management entity, at least one event which can occur in the second group whose occurrence in said second group can affect validity of said fact;
  maintaining a watch, in said second management entity and autonomously of said first management entity, for occurrence of said event; and
  upon detecting occurrence of said event, in said second management entity:
    determining whether said fact is valid or invalid;
    if said fact has become invalid, determining whether said sub-goal is still satisfied by performing inferencing operations on the declarative model and ascertaining whether a requirement relevant to said sub-goal is met by referring to said fact base;
    if said sub-goal is no longer satisfied, seeking an operation which will enable said sub-goal to be re-satisfied;
    performing said operation if one can be found; and
    if no such operation can be found, communicating non-satisfaction of said sub-goal to said first management entity.

12. The system management method of claim 11 wherein the at least one event affects availability of the service.

13. The method of claim 11, wherein the determination of whether the goal is satisfied is performed and the links are established when the goal is first provided.

14. System management apparatus for monitoring occurrence of and attempting to remedy effects of events in a computer system made up of cooperating physical and logical entities, said entities being logically arranged into groups and each group including a management entity, and said events affecting a service intended to be provided by entities in a first group, said apparatus comprising:

a first management entity for a respective first one of said groups;

a second management entity for a respective second one of said groups different from said first group;

a declarative model specifying requirements needing to be met for said service to be available, said requirements being set out in terms of the entities required and their inter-relationships;

an inference engine in said second management entity for carrying out inferencing operations in relation to said declarative model;

a specification of a goal to be satisfied by said system in respect of at least one aspect of said service;

an identification, in said first management entity, that satisfaction of said goal requires a sub-goal to be satisfied, and that satisfaction of said sub-goal involves system entities in said second group;

means for communication to said second management entity from said first management entity a requirement to determine whether said sub-goal is satisfied;

a fact base storing facts relating to the second group;

an identification, in said second management entity, of at least one fact which relates to said second group and upon which said sub-goal depends, said fact being included in said fact base;

at least one link, said one link being established by determining, in said second management entity, whether said sub-goal is satisfied, said link indicating a dependency relationship between said sub-goal and said at least one fact, and being included in said fact base;

a definition, in said second management entity, of at least one event which can occur in the second group and whose occurrence in said second group can affect validity of said fact;

means in said second management entity for maintaining a watch, autonomously of said first management entity, for occurrence of said event and upon detection thereof:
determining whether said face is valid or invalid;
if said fact has become invalid, causing said inferencing engine to perform inferencing operations on the declarative model, ascertaining whether a requirement relevant to said sub-goal is met by making reference to said fact base to determine whether said sub-goal is still satisfied;
if said sub-goal is no longer satisfied, seeking an operation which will enable said sub-goal to be re-satisfied;
performing said operation if one can be found; and
if no such operation can be found, communicating non-satisfaction of said sub-goal to said first management entity.

15. The system management apparatus of claim 14 wherein the at least one event affects availability of the service.

16. The apparatus of claim 14, wherein the determination of whether the goal is satisfied is performed and the links are established when the goal is first provided.

* * * * *